(12) United States Patent
Li et al.

(10) Patent No.: US 8,903,403 B2
(45) Date of Patent: Dec. 2, 2014

(54) METHOD AND APPARATUS FOR EVALUATING CROSS-CELL COVERAGE

(75) Inventors: He Li, Shenzhen (CN); Huimin Pei, Shenzhen (CN)

(73) Assignee: ZTE Corporation, Shenzhen (CN)

(*) Notice: Subject to any disclaimer, the term of this patent is extended or adjusted under 35 U.S.C. 154(b) by 330 days.

(21) Appl. No.: 13/258,222

(22) PCT Filed: May 24, 2010

(86) PCT No.: PCT/CN2010/073177
§ 371 (c)(1),
(2), (4) Date: Apr. 27, 2012

(87) PCT Pub. No.: WO2010/145418
PCT Pub. Date: Dec. 23, 2010

(65) Prior Publication Data
US 2012/0208587 A1 Aug. 16, 2012

(30) Foreign Application Priority Data
Oct. 28, 2009 (CN) .......................... 2009 1 0209140

(51) Int. Cl.
*H04W 4/00* (2009.01)
*H04W 24/02* (2009.01)

(52) U.S. Cl.
CPC ...................................... *H04W 24/02* (2013.01)
USPC ......................................................... 455/443

(58) Field of Classification Search
USPC .............. 455/443, 436–442, 446, 448, 432.1, 455/447
See application file for complete search history.

(56) References Cited

U.S. PATENT DOCUMENTS 6,188,894 B1   2/2001  Clancy 6,591,109 B2 *  7/2003  Pan ............................ 455/452.1
7,643,832 B2 *  1/2010  Cudak et al. ................... 455/450

FOREIGN PATENT DOCUMENTS

| CN | 1303575 A | 7/2001 |
| CN | 101351013 A | 1/2009 |
| CN | 101695173 A | 4/2010 |
| WO | 0030386 A1 | 5/2000 |
| WO | 0030389 A1 | 5/2000 |

OTHER PUBLICATIONS

International Search Report in international application No. PCT/CN2010/073177, mailed on Sep. 2, 2010.
English Translation of the Written Opinion of the International Search Authority in international application No. PCT/CN2010/073177, mailed on Sep. 2, 2010.
The Area Covered by the Base Station Control Mar. 31, 2008.

* cited by examiner

*Primary Examiner* — Brandon Miller
(74) *Attorney, Agent, or Firm* — Oppedahl Patent Law Firm LLC

(57) ABSTRACT

The present disclosure provides a method for evaluating cross-cell coverage, which includes: finding, according to a neighboring cell configuration table of a cell in a base station, a cell with a number of configured neighboring cells that is larger than a number threshold for configured neighboring cells; designating the found cell as an original cell; carrying out a processing to obtain the cross-cell coverage evaluation parameters of the original cell; and determining the original cell i provides and/or suffers from cross-cell coverage when the cross-cell coverage evaluation parameter of the original cell exceeds respective cross-cell coverage evaluation thresholds. The present disclosure further provides an apparatus for evaluating cross-cell evaluation, which is capable of determining whether or not a cell provides cross-cell coverage to make parameters of a wireless network adjusted timely and limit the coverage of the wireless network in a supposed one.

15 Claims, 5 Drawing Sheets

METHOD AND APPARATUS FOR EVALUATING CROSS-CELL COVERAGE

TECHNICAL FIELD

The present disclosure relates to the field of wireless network optimization and in particular to a method and an apparatus for evaluating cross-cell coverage in the wireless network optimization.

BACKGROUND

In a narrow sense, wireless network optimization refers to finding a cause of degradation of network quality through a parameter analysis and a hardware check of an currently operating network, performing a parameter modification, a network structure adjustment and a device configuration adjustment, etc., thereby greatly benefiting from the existing network resources, guaranteeing high-quality operation of a system and achieving a highest profit with a lowest investment.

In a general sense, wireless network optimization includes various aspects ranging from determination of network size, network capacity and capacity expansion scheme, to site location selection and network construction, and further to network parameter configuration. Each step performed during the wireless network optimization may be associated with network quality and affect development of the network. Typically, a network optimization can be divided into the following three stages:

(1) determining the capacity of the wireless network and the requirements on the capacity expansion of the wireless network;

(2) selecting a location for a site and constructing the site according to the geographic features of the region in which the wireless network is located;

(3) configuring parameters for the wireless network.

The stages (1) and (2) constitute a wireless network planning stage mainly for planning the specific distribution of network architecture, and the stage (3) is a wireless network configuration stage for implementing a wireless coverage. Each of the three stages is highly important. In the case that requirements on engineering quality are met in the stages (1) and (2), the stage (3) becomes particularly important.

During the process of existing wireless network optimization, from someone's viewpoint, the further a base station covers, the larger the signal-receiving area is. Therefore, in order to meet the requirements on wireless coverage, parameters such as antenna height and transmission power of base station, generally intend to be larger than normal, which though meets the coverage requirements, brings an immeasurable negative effect.

Taking a Code Division Multiple Access (CDMA) network as an example, the coverage distance of a base station is determined by such factors as the location of the base station and the density of sites. The coverage distance should be proper, neither too long nor too short. However, in order to meet the requirements on wireless coverage, a base station covers a distance actually much further than it is supposed to, and thus a mobile terminal far away from the base station can receive from the base station a signal with strength higher than a strength threshold of the mobile terminal signals. At this time, the mobile terminal sends a pilot measurement report, in which the phase of the cell with respect to the newly detected base station is carried, to its serving base station. Then, according to the phase of the cell with respect to the newly detected base station sent by the mobile station, the serving base station calculates a pseudo random code (PN) of the cell in which the new base station is located by dividing the phase by 64, wherein PN indicates an identifier of a cell in CDMA network, and a cell is associated with a PN. Then, the base station conducts a search in the neighboring cell configuration table to find a neighboring cell corresponding to the calculated PN, and establishes new channel resource for the mobile terminal in the neighboring cell. The neighboring cell configuration table is created based on distances between cells and the direction angles of cells. Specifically, the distances between cells should be as short as possible, and neighboring cells are preferred. Also, the direction angles of cells should be opposite to each other, that is, cells should have as many overlapping coverage areas as possible, so that a mobile terminal moving in a cell can receive a signal from another cell easily. Generally, a base station may enable a mobile terminal to handover to a new cell by sending cell handover indication information to the mobile terminal. However, if the newly detected cell is a cross-cell-coverage cell (i.e., a cell which has a larger coverage area than it is supposed to), and the active set cell which is serving the mobile terminal does not configure the newly detected cell, but configures another cell which has a same PN as that of the newly detected cell as a neighboring cell, the mobile terminal may detect a signal from the base station in newly detected cell, however, the serving base station will determine the target cell for handover add as the another cell having the same PN, leading to an error handover add and thus a call drop of the mobile terminal which severely affects user experience. The term "handover add" means, a serving base station establishes two-channel resources for a mobile terminal moving to the boundary of its serving cell, which are the channel resources of the serving cell and the channel resources of the cell to be hand over, respectively.

FIG. 1 shows an example of the cross-cell coverage of a cell, it can be seen from FIG. 1 that a mobile terminal initiates a call through a Base Transceiver Station (BTS) 4 and detects, during the communication, a signal from a cell of a BTS1, which provides cross-cell coverage and thus is not configured as a neighboring cell by the BTS4. After detecting the signal from the cell of the BTS1, the mobile terminal sends a pilot measurement report to the BTS4. The BTS4 finds, through calculation, that the PN of the cell of the BTS1 is PN2, and then conducts a search in the neighboring cell configuration table of the cell to find that the PN of the cell of a BTS3 is also PN2. Accordingly, the BTS4 incorrectly establishes new channel resources for the mobile terminal in the cell of the BTS3, while the signal actually detected by the mobile terminal is one from the cell of the BTS1. As a result, an error handover performed by the BTS4 causes a call drop of the mobile terminal.

In view of the above, it remains a problem needing an urgent solution how to effectively avoid the cross-cell coverage of a cell.

SUMMARY

Therefore, the main objective of the present disclosure is to provide a method and an apparatus for evaluating cross-cell coverage in wireless network optimization which are capable of effectively finding a cell having cross-cell coverage in a wireless network.

In order to achieve the objective above, the technical solution of the present disclosure is realized as follows.

A method for evaluating cross-cell coverage is provided in the present disclosure, which includes:

finding, according to a neighboring cell configuration table of a cell in a base station, a cell with a number of configured neighboring cells that is larger than a number threshold for configured neighboring cells;

designating the found cell as an original cell;

processing following information to get a cross-cell coverage evaluation parameter of the original cell:

local information of a cell from a location information table of the base station, a mainlobe of the original cell obtained from a background of the base station, a neighboring cell configuration table of the original cell, a radius of a smallest concentric circle, and detailed information during a call process of a mobile terminal; and when the cross-cell coverage evaluation parameter of the original cell exceeds a cross-cell coverage evaluation threshold, determining that the original cell provides and/or suffers from cross-cell coverage.

In the aforementioned solution, when the cross-cell coverage evaluation parameter of the original cell exceeds a cross-cell coverage evaluation threshold, determining that the original cell provides cross-cell coverage may include:

determining whether a loop on which a farthest neighboring cell is located is larger than a loop location threshold for the farthest neighboring cell;

when determining that the loop on which the farthest neighboring cell is located is larger than the loop location threshold for the farthest neighboring cell, determining whether a number of loops, on which configured neighboring cells within the mainlobe of the original cell in the loop, on which the farthest neighboring cell is located, are located, is larger than a loop number threshold for the configured neighboring cells within the mainlobe of the original cell in the loop on which the farthest neighboring cell is located;

when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, comparing distances of the mobile terminal to the original cell and to a neighboring cell with a first distance threshold and a second distance threshold;

when the distance of the mobile terminal to the original cell is larger than the second distance threshold, and the distance of the mobile terminal to the neighboring cell is either smaller than the first distance threshold, or larger than the first distance threshold and smaller than the second distance threshold, determining whether a number of handovers of the mobile terminal between the original cell and the neighboring cell exceeds a number threshold for handovers of the mobile terminal between the original cell and the neighboring cell; and when determining that the number of handovers of the mobile terminal between the original cell and the neighboring cell exceeds the number threshold for handovers of the mobile terminal between the original cell and the neighboring cell, determining that the original cell provides cross-cell coverage.

In the aforementioned solution, the method may further include:

when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, comparing distances of the mobile terminal to the original cell and to the neighboring cell with the first distance threshold and the second distance threshold;

when the distance of the mobile terminal to the neighboring cell is larger than the second distance threshold, and the distance of the mobile terminal to the original cell is either smaller than the first distance threshold, or larger than the first distance threshold and smaller than the second distance threshold, determining whether the number of handovers of the mobile terminal between the original cell and the neighboring cell exceeds the number threshold for handovers of the mobile terminal between the original cell and the neighboring cell; and when determining that the number of handovers of the mobile terminal between the original cell and the neighboring cell exceeds the number threshold for handovers of the mobile terminal between the original cell and the neighboring cell, determining that the original cell suffers from cross-cell coverage.

In the aforementioned solution, the method may further include:

inputting a cross-cell coverage evaluation threshold, before performance of the processing to get the cross-cell coverage evaluation parameter of the original cell;

the cross-cell coverage evaluation threshold comprises: the loop location threshold for the farthest neighboring cell, the loop number threshold for the configured neighboring cells within the mainlobe of the original cell in the loop on which the farthest neighboring cell is located, the distance thresholds, and the number threshold for handovers of the mobile terminal between the original cell and the neighboring cell when the distances of the mobile terminal to the original cell and to the neighboring cell are larger than the distance thresholds.

An apparatus for evaluating cross-cell coverage is also provided in the present disclosure, which includes:

an comparison and determination unit, configured to
find, according to a neighboring cell configuration table of a cell in a base station, a cell with a number of configured neighboring cells that is larger than a number threshold for configured neighboring cells,
designate the found cell as an original cell, and
determine that the original cell provides and/or suffers from cross-cell coverage when a cross-cell coverage evaluation parameter of the original cell exceeds a cross-cell coverage evaluation threshold; and a processing unit, configured to process following information to get the cross-cell coverage evaluation parameter:

local information of a cell from a location information table of the base station, a mainlobe of the original cell obtained from a background of the base station, a neighboring cell configuration table of the original cell, a radius of a smallest concentric circle, and detailed information during a call process of a mobile terminal.

In the aforementioned solution, the comparison and determination unit may be specifically configured to: determine whether a loop on which a farthest neighboring cell is located is larger than a loop location threshold for the farthest neighboring cell;

when determining that the loop on which the farthest neighboring cell is located is larger than the loop location threshold for the farthest neighboring cell, determine whether a number of loops, on which configured neighboring cells within the mainlobe of the original cell in the loop, on which the farthest neighboring cell is located, are located, is larger than a loop number threshold for the configured neighboring cells within the mainlobe of the original cell in the loop on which the farthest neighboring cell is located;

when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, compare distances of the mobile terminal to the original cell and to a neighboring cell with a first distance threshold and a second distance threshold;

when the distance of the mobile terminal to the neighboring cell is larger than the second distance threshold, and the distance of the mobile terminal to the original cell is either smaller than the first distance threshold, or larger than the first distance threshold and smaller than the second distance threshold, determine whether a number of handovers of the mobile terminal between the original cell and the neighboring cell exceeds a number threshold for handovers of the mobile terminal between the original cell and the neighboring cell; and when determining that the number of handovers of the mobile terminal between the original cell and the neighboring cell exceeds the number threshold for handovers of the mobile terminal between the original cell and the neighboring cell, determine that the original cell suffers from cross-cell coverage.

It can thus be seen that by using the solutions provided in the present disclosure, a cell having cross-cell coverage can be effectively found from wireless network, and the configuration parameters of the cell can be timely adjusted to limit the coverage of the cell within a desired range. Accordingly, the problem of call drop caused by cross-cell coverage may be resolved and user experience may be greatly improved.

DETAILED DESCRIPTION

A rational parameter configuration can effectively avoid the cross-cell coverage of a cell, and how to configure parameters more rationally depends on an effectively and scientifically developed optimization tool rather than artificial determination and analysis.

The basic idea of the present disclosure lies in that: according to the neighboring cell configuration table of a cell in a base station, a cell with the number of configured neighboring cells that is larger than a number threshold for configured neighboring cells, which is prone to have cross-cell coverage, is found and taken as an original cell. A processing is carried out to obtain a cross-cell coverage evaluation parameter of the original cell, and it is determined that the original cell provides or suffers from cross-cell coverage when the cross-cell coverage evaluation parameter of the original cell exceeds the cross-cell coverage evaluation threshold, thereby facilitating the following adjustment on the configuration parameters of the original cell to adjust the coverage of a wireless network to limit the coverage of a wireless cell in a supposed one.

The cross-cell coverage evaluation parameter includes: a loop on which a farthest neighboring cell is located; the number of loops, on which configured neighboring cells within the mainlobe of the original cell in the loop, on which the farthest neighboring cell is located, are located; the distance between the mobile terminal and the original cell and the distance between the mobile terminal and a neighboring cell; and the times of handover of the mobile terminal between the original cell and the neighboring cell, wherein the mainlobe refers to the included angle of the antennae of a cell; and correspondingly, the cross-cell coverage evaluation threshold includes: the loop location threshold for the farthest neighboring cell, the loop number threshold for the configured neighboring cells within the mainlobe of the original cell in the loop on which the farthest neighboring cell is located, the distance thresholds, and the number threshold for handovers of the mobile terminal between the original cell and the neighboring cell when the distances of the mobile terminal to the original cell and to the neighboring cell are larger than the distance thresholds.

Figure 1:
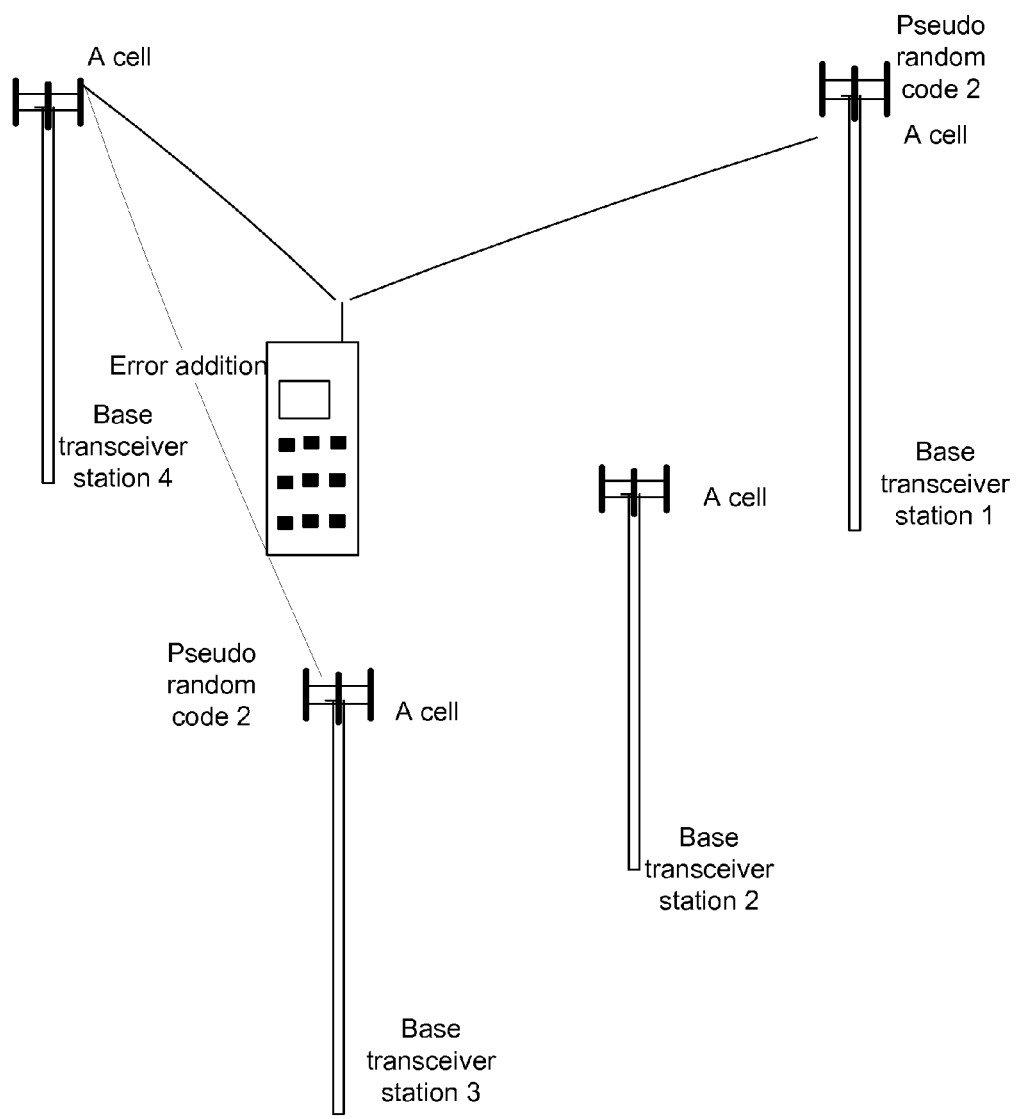
FIG. 1 is a schematic diagram illustrating the cross-cell coverage of a cell in a CDMA network.
Figure 2:
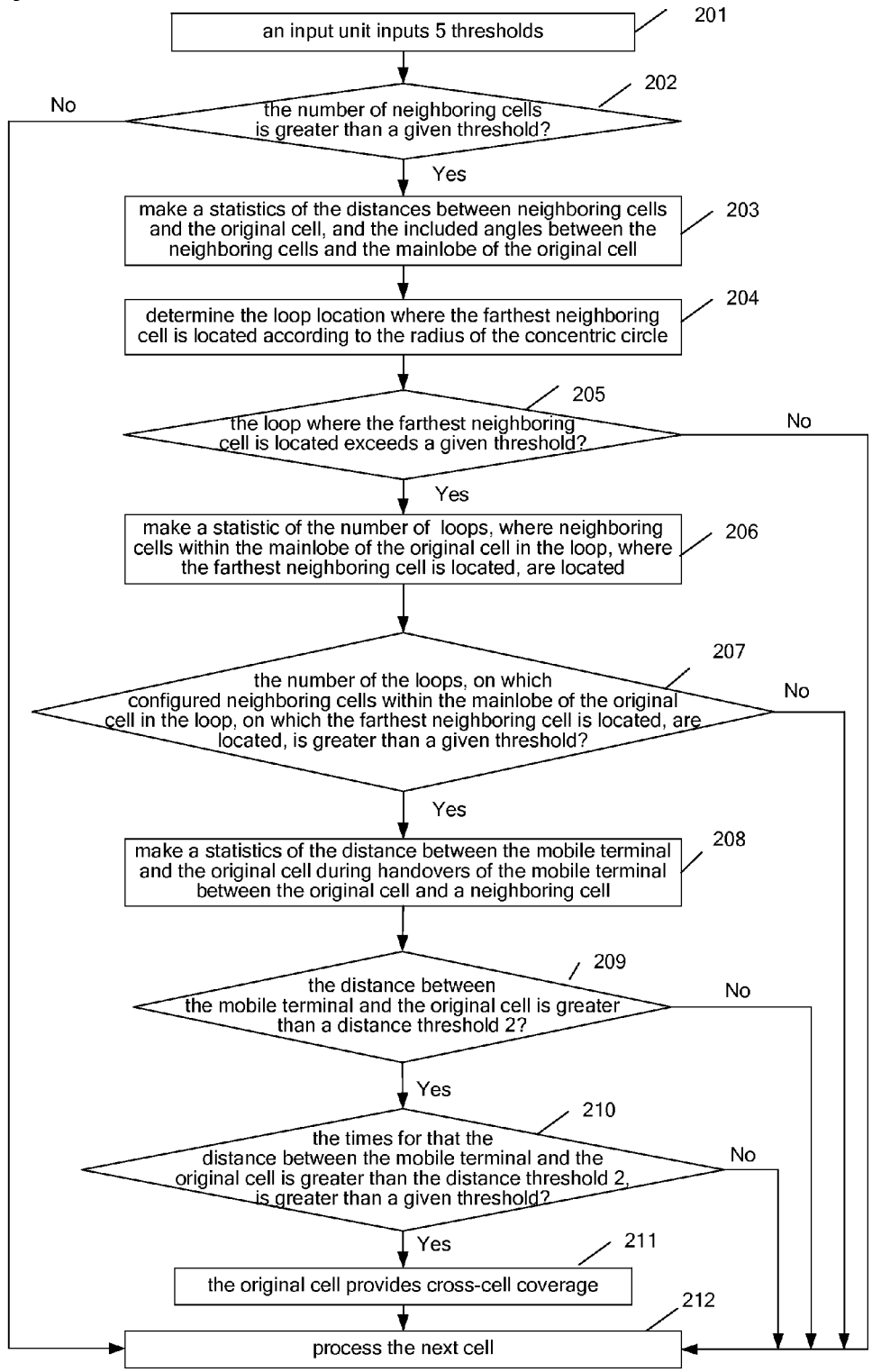
FIG. 2 is a flow chart illustrating a method for evaluating cross-cell coverage according to the present disclosure.

The evaluation process of the present disclosure is described below based on a specific embodiment, the apparatus for evaluating cross-cell coverage provided herein comprises an input unit, a processing unit, a comparison and determination unit and an output unit; and as shown in FIG. 2, the method for evaluating cross-cell coverage provided herein comprises the following steps.

Step 201: the input unit inputs, to the comparison and determination unit, a threshold for the number of the neighboring cells configured, the loop location threshold for the farthest neighboring cell, the loop number threshold for the configured neighboring cells within the mainlobe of the original cell in the loop on which the farthest neighboring cell is located, distance thresholds R1 and R2, and the number threshold for handovers of the mobile terminal between the original cell and the neighboring cell when the distance between the mobile terminal and the original cell and the distance between the mobile terminal and the neighboring cell are larger than the distance thresholds R1 and R2.

The threshold for the number of the neighboring cells configured is determined according to the distribution density of base stations and the number of the neighboring cell configured contained in the neighboring cell configuration table of a cell. If the number of the neighboring cell configured contained in the neighboring cell configuration table of a cell is greater than the corresponding threshold, then a cell with a number of configured neighboring cells that is larger than the number threshold for configured neighboring cells, is taken as an original cell. The original cell is taken as the center to draw concentric circles, each of which has a radius in a multiple relationship with that of the smallest concentric circle. In this way, in the following processing, the neighboring cells of the original cell can be divided into different loops spaced by a distance equal to the radius of the smallest concentric circles. The radiuses of the concentric circles are determined according to the density of the base stations, where base stations are densely distributed, the radius of the concentric circle is small, and where base stations are discretely distributed, the radius of the concentric circle is large.

The loop location threshold for the farthest neighboring cell, which is a limitation to the loop location of the farthest neighboring cell, is determined according to the density of the base stations in different cities or suburbs and should be properly increased if the distance between base stations is far. It is indicated, if the threshold is exceeded, that the farthest neighboring cell is extremely far away from the original cell, and that the coverage of the original cell is large.

The loop number threshold for the configured neighboring cells within the mainlobe of the original cell in the loop on which the farthest neighboring cell is located refers to the maximum rational number of the neighboring cells configured between the original cell and the farthest neighboring cell. It is indicated, if the loop number threshold is exceeded, that the neighboring cells are irrationally and densely distributed between the original cell and the farthest neighboring cell, and that there is a possibility that the original cell provides cross-cell coverage. The loop number threshold is determined according to the density of base stations and the geographic environment, and typically, 3-4 loops are preferred.

Figure 3:
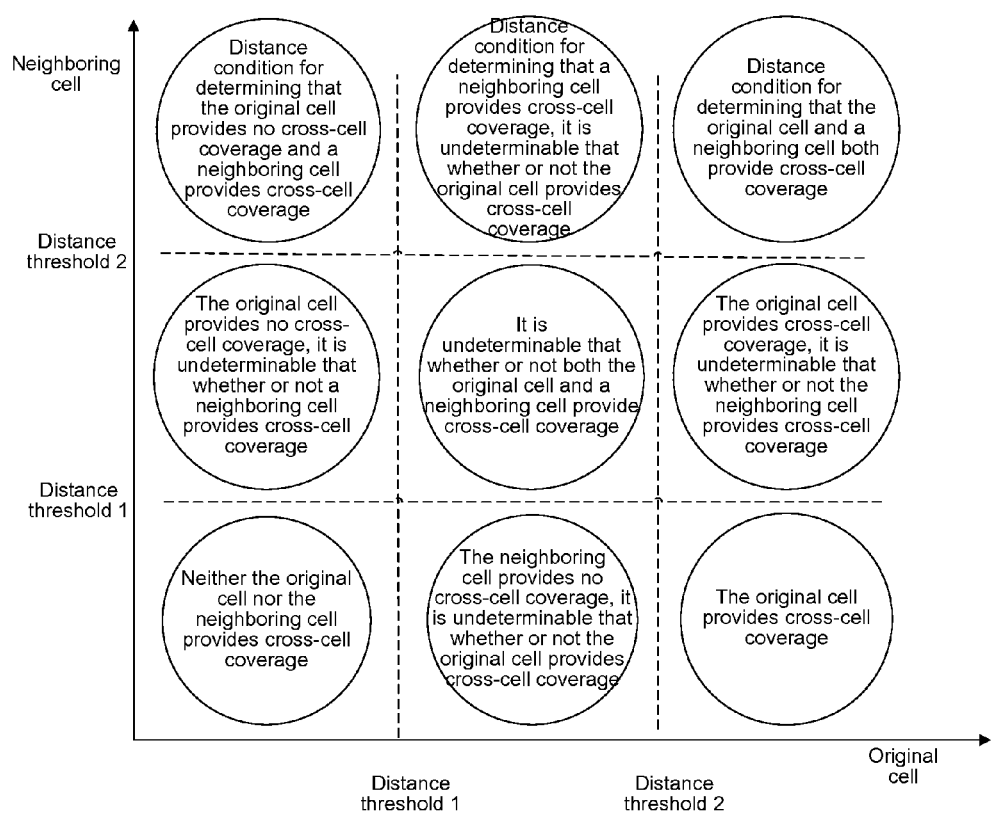
FIG. 3 is a schematic diagram illustrating distance thresholds R1 and R2 according to the present disclosure.

The distance thresholds R1 and R2 are determined according to the density of the base stations in different urban areas, it is impossible that the original cell provides cross-cell coverage when the distance between the mobile terminal and the original cell is within R1. It is indicated by the exceeding of the distance between the mobile terminal and the original cell over R2 that the mobile terminal is far away from the original cell and the original cell meets a distance condition for a cross-cell coverage determination. FIG. 3 visually shows the relationship between the distances of a mobile terminal to the original cell and to the neighboring cell and cross-cell coverage. When a mobile terminal is handed over between an original cell and a neighboring cell, if the distance between the mobile terminal and the original cell and the distance between the mobile terminal and the neighboring cell are both within R1, then neither the original cell nor the neighboring cell provides cross-cell coverage; if the distance between the mobile terminal and the original cell or the neighboring cell is larger than R1 but small than R2, then it cannot be determined whether or not the original cell or the neighboring cell provides cross-cell coverage; if the distance between the mobile terminal and the original cell and the distance between the mobile terminal and the neighboring cell are both greater than R2, then both the original cell and the neighboring cell meet the distance condition for a cross-cell coverage determination.

The number threshold for handovers of the mobile terminal between the original cell and the neighboring cell refers to the times the mobile terminal is handed over between the original cell and the neighboring cell when the distance between the mobile terminal and the original cell is greater than R2 and the distance between the mobile terminal and the neighboring cell is smaller than R1 or greater than R1 but smaller than R2. It is indicated, if the number threshold is exceeded, that occasional factors such as a signal drifting of the original cell and a signal reflection by other buildings cannot be the reason for the mobile terminal' acquisition of a signal from the original cell and handover to the original cell. The number threshold is input according to demands of users, the larger the threshold is, the less the obtained cells having cross-cell coverage are, and likewise, the larger the cross-cell coverage of the cells is, the smaller the threshold is, and the less the obtained cells having cross-cell coverage are.

Step 202: the comparison and determination unit determines whether or not the number of the neighboring cells is greater than the threshold for the number of the neighboring cells configured according to the neighboring cell configuration table of a cell in the base station, determines the cell does not have cross-cell coverage when the number of neighboring cells configured contained in the neighboring cell configuration table is smaller than the threshold, and then Step 212 is executed, otherwise, Step 203 is executed by taking the cell as the original cell.

Step 203: the processing unit calculates the distance between a neighboring cell and the original cell according to the location information table of the base station. The location information table of the base station includes location information of the cells in all the base stations in the whole network, wherein the location information includes the azimuth and the longitude and latitude of a base station. Therefore, the distance between the neighboring cell and the original cell can be calculated according to a spherical distance calculation formula based on longitudes and latitudes of the neighboring cell and the original cell. The included angle between the neighboring cell and the mainlobe of the original cell is calculated according to the calculated distance in combination with the mainlobe of the original cell acquired by the background of the base station and the neighboring cell configuration table of the original cell.

the process of calculating the included angle between the neighboring cell and the mainlobe of the original cell is as follows: equally dividing the mainlobe of the original cell by an azimuth line, and making a connecting line connecting the original cell and the neighboring cell; the included angle formed between the connecting line and the azimuth line represents the included angle between a neighboring cell and the mainlobe of the original cell, the included angle should be formed in half of the mainlobe of the original cell, and the neighboring cell with an included angle smaller than half of the mainlobe is located in the mainlobe of the original cell.

Step 204: the processing unit determines the loop location where the neighboring cell locates by rounding up the ratio of the distance between the neighboring cell and the original cell to the radius of the smallest concentric circle, for instance, the neighboring cell is located in the third loop if the ratio is 3, and is located in the fourth loop if the ratio is 3.2. The loop location of the neighboring cell farthest from the original cell, that is, the greatest loop location, is determined by sorting the neighboring cells according to the descending order of the loop locations, and then the loop location of the farthest neighboring cell is output to the comparison and determination unit.

Step 205: the compassion and determination unit compares the loop location where the farthest neighboring cell is located output by the processing unit with the loop location threshold for the farthest neighboring cell input by the input unit, when the former is greater than the latter, Step 206 is executed, otherwise, determines the original cell has no cross-cell coverage, and then Step 212 is executed.

Step 206: the processing unit makes a statistics of the number of loops where neighboring cells within the mainlobe of the original cell in each loop are located, excluding softer handover cells, according to a loop location of neighboring cell and an included angle between the neighboring cell and the mainlobe of the original cell. The softer handover cells refer to that: handover occurs between cells in one base station. Since the softer handover cells have the same longitude and latitude, and the distance between them is 0, the softer handover cells are not taken into consideration during the statistics. The statistics process is as follows: the processing unit determines which neighboring cell is located in the mainlobe of the original cell according to the included angle between the neighboring cell and the mainlobe of the original cell, determines the number of the loops where neighboring cells are located according to the loop locations of the neighboring cells, thereby acquiring the number of the loops where neighboring cells within the mainlobe of the original cell in each loop are located, further acquiring the number of the loops, on which configured neighboring cells within the mainlobe of the original cell in the loop, on which the farthest neighboring cell is located, are located, which is output to the comparison and determination unit.

Step 207: the comparison and determination unit compares the number of the loops, on which configured neighboring cells within the mainlobe of the original cell in the loop, on which the farthest neighboring cell is located, are located, which is output by the processing unit, with the loop number threshold for the configured neighboring cells within the mainlobe of the original cell in the loop on which the farthest neighboring cell is located, which is input by the input unit. Step 208 is executed when the former is greater than the latter, otherwise, determines the original cell has no cross-cell coverage, and Step 212 is executed.

Step 208: the processing unit acquires, by inquiring the specific information recorded by the background of the base station on the communication of the mobile terminal and looking up the neighboring cell configuration table of the original cell, a record on the handovers of the mobile terminal between the original cell and a neighboring cell, the distance between the mobile terminal and the original cell and the distance between the mobile terminal and a neighboring cell during each handover, and the times of handovers of the mobile terminal between the original cell and the neighboring cell, and outputs the acquired information to the comparison and determination unit. The specific information recorded by the background of the base station on the communication of the mobile terminal includes: a record on the handovers of the mobile terminal between cells, and the distance between the mobile terminal and each cell during each handover.

Step 209: the comparison and determination unit compares the distance between the mobile terminal and the original cell and the distance between the mobile terminal and a neighboring cell, output by the processing unit, with distance thresholds R1 and R2 input by the input unit, Step 210 is executed when the distance between the mobile terminal and the original cell output by the processing unit is greater than the distance threshold R2 input by the input unit and the distance between the mobile terminal and the neighboring cell output by the processing unit is smaller than R1, or greater than R1 but smaller than R2, otherwise, determines the original cell has no cross-cell coverage, and then Step 212 is executed.

Step 210: the comparison and determination unit compares the number of handovers of the mobile terminal between the original cell and a neighboring cell output by the processing unit with the number threshold for handovers of the mobile terminal between the original cell and the neighboring cell input by the input unit, executes Step 211 when the former exceeds the latter, otherwise, determines the original cell has no cross-cell coverage, and then executes Step 212.

Step 211: the comparison and determination unit determines the original cell provides cross-cell coverage and outputs the result of the determination to the output unit, the output unit outputs the result of the determination, and the background of the base station regulates the configuration parameters of the original cell to limit the coverage of the original cell in a proper one.

Step 212: the next cell is processed.

By modifying part of the condition, the present disclosure can make another determination on whether or not the original cell suffers from cross-cell coverage, that is, whether or not the original cell is crossed by a neighboring cell. Referring to FIG. 2, after Step 208, the comparison and determination unit compares the distance between the mobile terminal and the original cell and the distance between the mobile terminal and a neighboring cell, input by the processing unit, with the distance thresholds input by the input unit; determines the number for handovers of the mobile terminal between the original cell and the neighboring cell when the distance between the mobile terminal and the neighboring cell is greater than R2 and the distance between the mobile terminal and the original cell is smaller than R1, or greater than R1 but smaller than R2; and determines the original cell suffers from cross-cell coverage when the number for handovers of the mobile terminal between the original cell and the neighboring cell input by the processing unit is greater than the number threshold input by the input unit. Subsequently, the background of the base station regulates the configuration parameters of the original cell to limit the coverage thereof in a proper one.

After Step 208, a determination on whether or not the original cell provides cross-cell coverage and a determination on whether or not the original cell suffers from cross-cell coverage can be carried out synchronously or independently.

Figure 4:
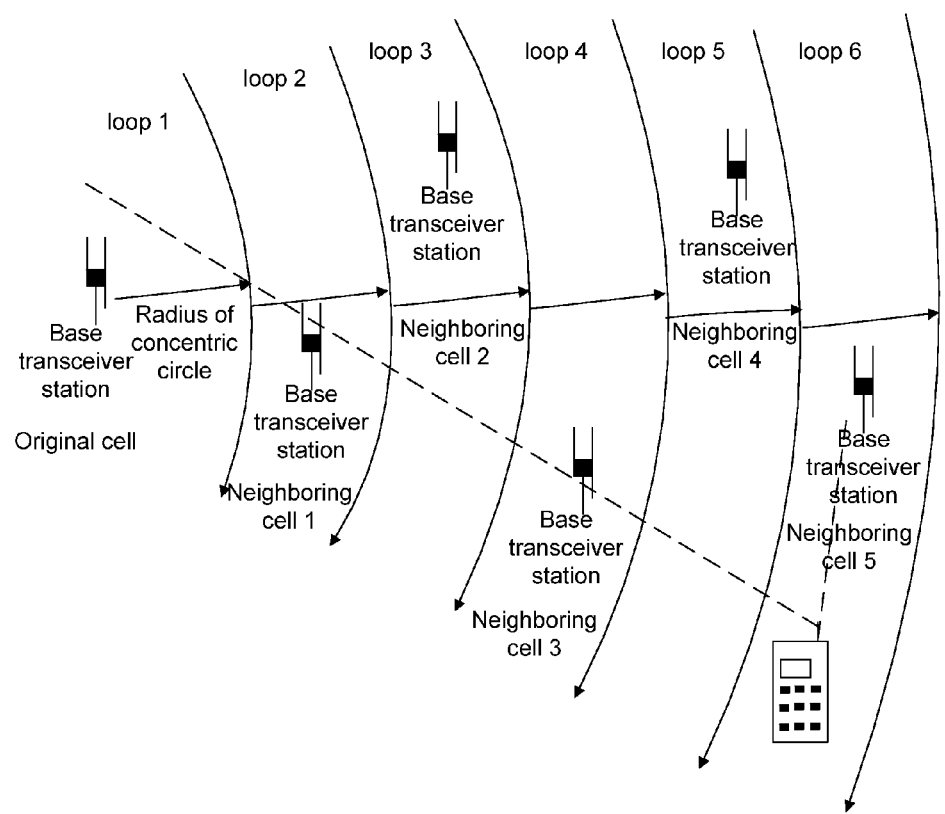
FIG. 4 is an exemplary diagram illustrating a cross-cell coverage evaluation according to the present disclosure.

The condition for determining the cross-cell coverage of the original cell is described below in detail by reference to a specific example, as shown in FIG. 4.

The original cell is X, neighboring cells are A1-A5 which are respectively located in the second to the sixth loop, and the farthest neighboring cell is A5. According to the input of the input unit, the loop location threshold for the farthest neighboring cell is 4, the loop number threshold for the configured neighboring cells within the mainlobe of the original cell in the loop on which the farthest neighboring cell is located is 3, the number threshold for handovers of the mobile terminal between the original cell and the neighboring cells is 5, and R2 is 2000 m, wherein the distance between two loops is 500 m. It can be seen from FIG. 4 that:

(1) the farthest neighboring cell A5 is in the sixth loop, thus the condition for a cross-cell coverage determination is met;

(2) the cell X has 4 loops in which neighboring cells are configured before the neighboring cell A5, thus the condition for a cross-cell coverage determination is met; and (3) the distance between the mobile terminal and the original cell X is longer than 2500 m (greater than R2), and if the processing unit detects, from the background of the base station, that the number of handovers of the mobile terminal between the original cell and the neighboring cells is 10, then it can be determined that the original cell provides cross-cell coverage.

Figure 5:
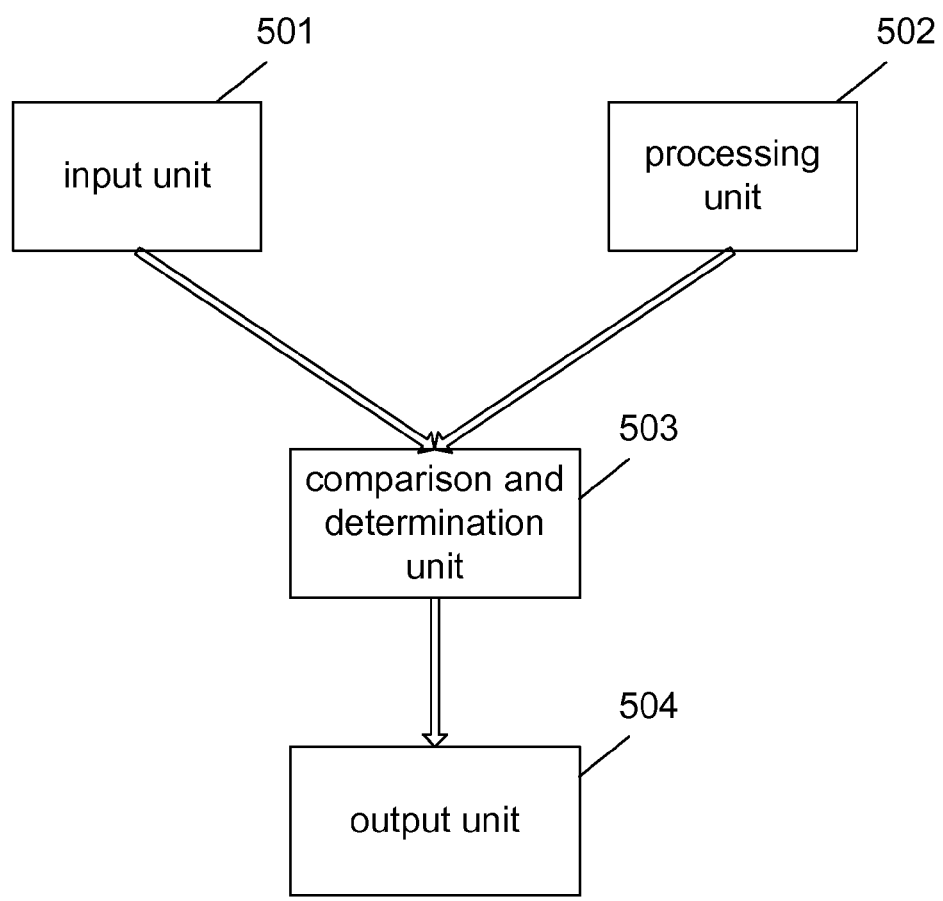
FIG. 5 is a schematic diagram illustrating an apparatus for evaluating cross-cell coverage according to the present disclosure.

Based on the aforementioned method, the present disclosure further provides an apparatus for estimating cross-cell coverage, which at least comprises, as shown in FIG. 5, a processing unit 502 and a comparison and determination unit 503.

The comparison and determination unit 503 is configured to: find, according to the neighboring cell configuration table of a cell in a base station, a cell with the number of configured neighboring cells is greater than a number threshold for configured neighboring cells; take the found cell as an original cell; and determine the original cell provides cross-cell coverage or suffers cross-cell coverage when a cross-cell coverage evaluation parameter of the original cell exceeds a cross-cell coverage evaluation threshold, and the processing unit 502 is configured to carry out a processing to obtain the cross-cell estimation parameter of the original cell.

Specifically, the processing unit 502 is configured to process the following information to get the cross-cell coverage evaluation parameter of the original cell: detailed information during a call process of a mobile terminal, the mainlobe of the original cell, and the location information table of the base station obtained from the background of the base station, and the information in the neighboring cell configuration table of the original cell. The processing unit 502 is also configured to send the cross-cell coverage estimation parameter to the comparison and determination unit 503. The cross-cell coverage estimation parameter of the original cell including: a loop on which a farthest neighboring cell is located; the number of loops, on which configured neighboring cells within the mainlobe of the original cell in the loop, on which the farthest neighboring cell is located, are located; the distance between the mobile terminal and the original cell and the distance between the mobile terminal and a neighboring cell; and the times of handover of the mobile terminal between the original cell and the neighboring cell. The specific processing carried out by the processing unit 502 can be understood by reference to the description given in FIG. 2 and is therefore not illustrated here repeatedly.

Specifically, the comparison and determination unit 503 is configured to compare the cross-cell coverage estimation parameter sent by the processing unit 502 with the cross-cell coverage estimation parameter threshold input by the input unit 501, determines the original cell provides cross-cell coverage when the cross-cell coverage estimation parameter is greater than the cross-cell coverage estimation parameter threshold, or determines the original cell provides no cross-cell coverage when the cross-cell coverage estimation parameter is not greater than the cross-cell coverage estimation parameter threshold.

Specifically, the comparison and determination unit 503 is configured to:

determine whether a loop on which a farthest neighboring cell is located is larger than a loop location threshold for the farthest neighboring cell;

when determining that the loop on which the farthest neighboring cell is located is larger than the loop location threshold for the farthest neighboring cell, determine whether a number of loops, on which configured neighboring cells within the mainlobe of the original cell in the loop, on which the farthest neighboring cell is located, are located, is larger than a loop number threshold for the configured neighboring cells within the mainlobe of the original cell in the loop on which the farthest neighboring cell is located;

when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, compare distances of the mobile terminal to the original cell and to a neighboring cell with a first distance threshold and a second distance threshold;

when the distance of the mobile terminal to the original cell is larger than the second distance threshold, and the distance of the mobile terminal to the neighboring cell is either smaller than the first distance threshold, or larger than the first distance threshold and smaller than the second distance threshold, determine whether the number of handovers of the mobile terminal between the original cell and the neighboring cell exceeds a number threshold for handovers of the mobile terminal between the original cell and the neighboring cell; and when determining that the number of handovers of the mobile terminal between the original cell and the neighboring cell exceeds the number threshold for handovers of the mobile terminal between the original cell and the neighboring cell, determine that the original cell provides cross-cell coverage. The first distance threshold is the maximum distance value for determining a cell provides definitely no cross-cell coverage, and the second distance threshold is the minimum distance value for determining a cell provides definitely cross-cell coverage.

The comparison and determination unit, when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, is further configured to:

compare distances of the mobile terminal to the original cell and to the neighboring cell with the first distance threshold and the second distance threshold;

when the distance of the mobile terminal to the neighboring cell is larger than the second distance threshold, and the distance of the mobile terminal to the original cell is either smaller than the first distance threshold, or larger than the first distance threshold and smaller than the second distance threshold, determine whether the number of handovers of the mobile terminal between the original cell and the neighboring cell exceeds the number threshold for handovers of the mobile terminal between the original cell and the neighboring cell; and when determining that the number of handovers of the mobile terminal between the original cell and the neighboring cell exceeds the number threshold for handovers of the mobile terminal between the original cell and the neighboring cell, determine that the original cell suffers from cross-cell coverage.

The comparison and determination unit 503 is configured to:

determine whether a loop on which a farthest neighboring cell is located is larger than a loop location threshold for the farthest neighboring cell;

when determining that the loop on which the farthest neighboring cell is located is larger than the loop location threshold for the farthest neighboring cell, determine whether a number of loops, on which configured neighboring cells within the mainlobe of the original cell in the loop, on which the farthest neighboring cell is located, are located, is larger than a loop number threshold for the configured neighboring cells within the mainlobe of the original cell in the loop on which the farthest neighboring cell is located;

when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, compare distances of the mobile terminal to the original cell and to a neighboring cell with a first distance threshold and a second distance threshold;

when the distance of the mobile terminal to the neighboring cell is larger than the second distance threshold, and the distance of the mobile terminal to the original cell is either smaller than the first distance threshold, or larger than the first distance threshold and smaller than the second distance threshold, determine whether a number of handovers of the mobile terminal between the original cell and the neighboring cell exceeds a number threshold for handovers of the mobile terminal between the original cell and the neighboring cell; and when determining that the number of handovers of the mobile terminal between the original cell and the neighboring cell exceeds the number threshold for handovers of the mobile terminal between the original cell and the neighboring cell, determine that the original cell suffers from cross-cell coverage.

The apparatus further comprises an input unit 501 and an output unit 504.

The input unit 501 is configured to send a threshold for the number of the neighboring cells configured and the cross-cell coverage estimation threshold to the comparison and determination unit 503, wherein the cross-cell coverage evaluation threshold includes: the loop location threshold for the farthest neighboring cell, the loop number threshold for the configured neighboring cells within the mainlobe of the original cell in the loop on which the farthest neighboring cell is located, the distance thresholds of the mobile terminal to the original cell and to the neighboring cell, and the number threshold for handovers of the mobile terminal between the original cell and the neighboring cell when the distances of the mobile terminal to the original cell and to the neighboring cell are larger than the distance thresholds.

The output unit 504 is configured to output the result of the determination carried out by the comparison and determination unit 503.

The mentioned above is only preferred embodiments of the present disclosure but not limitation for the protection scope of the present disclosure, various modification and variations can be devised by those skilled in this art, and it should be understood that any modification, equivalent and improvement devised without departing from the scope of the present disclosure belong to the protection scope of the present disclosure.

The invention claimed is:

1. A method for evaluating cross-cell coverage, comprising:
    finding, according to a neighboring cell configuration table of a cell of a base station, a cell with a number of configured neighboring cells that is larger than a number threshold for configured neighboring cells;
    designating the found cell as an original cell;
    processing relevant information to get a cross-cell coverage evaluation parameter of the original cell, wherein the relevant information includes:
    local information of the original cell and the neighboring cells of the original cell from a location information table of the base station, a mainlobe of the original cell obtained from a background of the base station, a neighboring cell configuration table of the original cell, a radius of a smallest concentric circle, and detailed information during a call process of a mobile terminal; and
    when the cross-cell coverage evaluation parameter of the original cell exceeds a cross-cell coverage evaluation threshold, determining that the original cell provides and/or suffers from cross-cell coverage.

2. The method according to claim 1, wherein when the cross-cell coverage evaluation parameter of the original cell exceeds a cross-cell coverage evaluation threshold, determining that the original cell provides cross-cell coverage comprises:
    determining whether a loop on which a farthest neighboring cell is located is larger than a loop location threshold for the farthest neighboring cell;
    when determining that the loop on which the farthest neighboring cell is located is larger than the loop location threshold for the farthest neighboring cell, determining whether a number of loops, on which configured neighboring cells within the mainlobe of the original cell in the loop on which the farthest neighboring cell is located, are located, is larger than a loop number threshold for the configured neighboring cells within the mainlobe of the original cell in the loop on which the farthest neighboring cell is located;
    when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, comparing distances of the mobile terminal to the original cell and to a neighboring cell with a first distance threshold and a second distance threshold;
    when the distance of the mobile terminal to the original cell is larger than the second distance threshold, and the distance of the mobile terminal to the neighboring cell is either smaller than the first distance threshold, or larger than the first distance threshold and smaller than the second distance threshold, determining whether a number of handovers of the mobile terminal between the original cell and the neighboring cell exceeds a number threshold for handovers of the mobile terminal between the original cell and the neighboring cell; and
    when determining that the number of handovers of the mobile terminal between the original cell and the neighboring cell exceeds the number threshold for handovers of the mobile terminal between the original cell and the neighboring cell, determining that the original cell provides cross-cell coverage.

3. The method according to claim 2, further comprising:
    when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located,
    comparing distances of the mobile terminal to the original cell and to the neighboring cell with the first distance threshold and the second distance threshold;
    when the distance of the mobile terminal to the neighboring cell is larger than the second distance threshold, and the distance of the mobile terminal to the original cell is either smaller than the first distance threshold, or larger than the first distance threshold and smaller than the second distance threshold, determining whether the number of handovers of the mobile terminal between the original cell and the neighboring cell exceeds the number threshold for handovers of the mobile terminal between the original cell and the neighboring cell; and
    when determining that the number of handovers of the mobile terminal between the original cell and the neighboring cell exceeds the number threshold for handovers of the mobile terminal between the original cell and the neighboring cell, determining that the original cell suffers from cross-cell coverage.

4. The method according to claim 3, further comprising:
    inputting a cross-cell coverage evaluation threshold, before performance of the processing to get the cross-cell coverage evaluation parameter of the original cell;
    the cross-cell coverage evaluation threshold comprises: the loop location threshold for the farthest neighboring cell, the loop number threshold for the configured neighboring cells within the mainlobe of the original cell in the loop on which the farthest neighboring cell is located, the distance thresholds, and the number threshold for handovers of the mobile terminal between the original cell and the neighboring cell when the distances of the mobile terminal to the original cell and to the neighboring cell are larger than the distance thresholds.

5. The method according to claim 2, further comprising:
inputting a cross-cell coverage evaluation threshold, before performance of the processing to get the cross-cell coverage evaluation parameter of the original cell;
the cross-cell coverage evaluation threshold comprises: the loop location threshold for the farthest neighboring cell, the loop number threshold for the configured neighboring cells within the mainlobe of the original cell in the loop on which the farthest neighboring cell is located, the distance thresholds, and the number threshold for handovers of the mobile terminal between the original cell and the neighboring cell when the distances of the mobile terminal to the original cell and to the neighboring cell are larger than the distance thresholds.

6. The method according to claim 1, wherein when the cross-cell coverage evaluation parameter of the original cell exceeds a cross-cell coverage evaluation threshold, determining that the original cell suffers from cross-cell coverage comprises:
determining whether a loop on which a farthest neighboring cell is located is larger than a loop location threshold for the farthest neighboring cell;
when determining that the loop on which the farthest neighboring cell is located is larger than the loop location threshold for the farthest neighboring cell, determining whether a number of loops, on which configured neighboring cells within the mainlobe of the original cell in the loop on which the farthest neighboring cell is located, are located, is larger than a loop number threshold for the configured neighboring cells within the mainlobe of the original cell in the loop on which the farthest neighboring cell is located;
when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, comparing distances of the mobile terminal to the original cell and to a neighboring cell with a first distance threshold and a second distance threshold;
when the distance of the mobile terminal to the neighboring cell is larger than the second distance threshold, and the distance of the mobile terminal to the original cell is either smaller than the first distance threshold, or larger than the first distance threshold and smaller than the second distance threshold, determining whether a number of handovers of the mobile terminal between the original cell and the neighboring cell exceeds a number threshold for handovers of the mobile terminal between the original cell and the neighboring cell; and
when determining that the number of handovers of the mobile terminal between the original cell and the neighboring cell exceeds the number threshold for handovers of the mobile terminal between the original cell and the neighboring cell, determining that the original cell suffers from cross-cell coverage.

7. The method according to claim 6, further comprising:
inputting a cross-cell coverage evaluation threshold, before performance of the processing to get the cross-cell coverage evaluation parameter of the original cell;
the cross-cell coverage evaluation threshold comprises: the loop location threshold for the farthest neighboring cell, the loop number threshold for the configured neighboring cells within the mainlobe of the original cell in the loop on which the farthest neighboring cell is located, the distance thresholds, and the number threshold for handovers of the mobile terminal between the original cell and the neighboring cell when the distances of the mobile terminal to the original cell and to the neighboring cell are larger than the distance thresholds.

8. An apparatus for evaluating cross-cell coverage, comprising:
an comparison and determination unit, configured to
find, according to a neighboring cell configuration table of a cell of a base station, a cell with a number of configured neighboring cells that is larger than a number threshold for configured neighboring cells,
designate the found cell as an original cell, and
determine that the original cell provides and/or suffers from cross-cell coverage when a cross-cell coverage evaluation parameter of the original cell exceeds a cross-cell coverage evaluation threshold; and
a processing unit, configured to process relevant information to get the cross-cell coverage evaluation parameter, wherein the relevant information includes:
local information of the original cell and the neighboring cells of the original cell from a location information table of the base station, a mainlobe of the original cell obtained from a background of the base station, a neighboring cell configuration table of the original cell, a radius of a smallest concentric circle, and detailed information during a call process of a mobile terminal.

9. The apparatus according to claim 8, wherein the comparison and determination unit is specifically configured to:
determine whether a loop on which a farthest neighboring cell is located is larger than a loop location threshold for the farthest neighboring cell;
when determining that the loop on which the farthest neighboring cell is located is larger than the loop location threshold for the farthest neighboring cell, determine whether a number of loops, on which configured neighboring cells within the mainlobe of the original cell in the loop on which the farthest neighboring cell is located, are located, is larger than a loop number threshold for the configured neighboring cells within the mainlobe of the original cell in the loop on which the farthest neighboring cell is located;
when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, compare distances of the mobile terminal to the original cell and to a neighboring cell with a first distance threshold and a second distance threshold;
when the distance of the mobile terminal to the original cell is larger than the second distance threshold, and the distance of the mobile terminal to the neighboring cell is either smaller than the first distance threshold, or larger than the first distance threshold and smaller than the second distance threshold, determine whether a number of handovers of the mobile terminal between the original cell and the neighboring cell exceeds a number threshold for handovers of the mobile terminal between the original cell and the neighboring cell; and
when determining that the number of handovers of the mobile terminal between the original cell and the neighboring cell exceeds the number threshold for handovers of the mobile terminal between the original cell and the neighboring cell, determine that the original cell provides cross-cell coverage.

10. The apparatus according to claim 9, further comprising an input unit, configured to input the cross-cell evaluation threshold to the comparison and determination unit;
wherein the cross-cell coverage evaluation threshold comprises: the loop location threshold for the farthest neighboring cell, the loop number threshold for the configured neighboring cells within the mainlobe of the original cell in the loop on which the farthest neighboring cell is located, the distance thresholds, and the number threshold for handovers of the mobile terminal between the original cell and the neighboring cell when the distances of the mobile terminal to the original cell and to the neighboring cell are larger than the distance thresholds.

11. The apparatus according to claim 8, wherein the comparison and determination unit, when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, is further configured to:
compare distances of the mobile terminal to the original cell and to the neighboring cell with the first distance threshold and the second distance threshold;
when the distance of the mobile terminal to the neighboring cell is larger than the second distance threshold, and the distance of the mobile terminal to the original cell is either smaller than the first distance threshold, or larger than the first distance threshold and smaller than the second distance threshold, determine whether the number of handovers of the mobile terminal between the original cell and the neighboring cell exceeds the number threshold for handovers of the mobile terminal between the original cell and the neighboring cell; and
when determining that the number of handovers of the mobile terminal between the original cell and the neighboring cell exceeds the number threshold for handovers of the mobile terminal between the original cell and the neighboring cell, determine that the original cell suffers from cross-cell coverage.

12. The apparatus according to claim 11, further comprising an input unit, configured to input the cross-cell evaluation threshold to the comparison and determination unit;
wherein the cross-cell coverage evaluation threshold comprises: the loop location threshold for the farthest neighboring cell, the loop number threshold for the configured neighboring cells within the mainlobe of the original cell in the loop on which the farthest neighboring cell is located, the distance thresholds, and the number threshold for handovers of the mobile terminal between the original cell and the neighboring cell when the distances of the mobile terminal to the original cell and to the neighboring cell are larger than the distance thresholds.

13. The apparatus according to claim 8, wherein the comparison and determination unit is specifically configured to:
determine whether a loop on which a farthest neighboring cell is located is larger than a loop location threshold for the farthest neighboring cell;
when determining that the loop on which the farthest neighboring cell is located is larger than the loop location threshold for the farthest neighboring cell, determine whether a number of loops, on which configured neighboring cells within the mainlobe of the original cell in the loop on which the farthest neighboring cell is located, are located, is larger than a loop number threshold for the configured neighboring cells within the mainlobe of the original cell in the loop on which the farthest neighboring cell is located;
when determining the number of loops, on which configured neighboring cells within the mainlobe of the original cell in the loop, on which the farthest neighboring cell is located, are located, is larger than the loop number threshold for the configured neighboring cells within the mainlobe of the original cell in the loop on which the farthest neighboring cell is located, compare distances of the mobile terminal to the original cell and to a neighboring cell with a first distance threshold and a second distance threshold;
when the distance of the mobile terminal to the neighboring cell is larger than the second distance threshold, and the distance of the mobile terminal to the original cell is either smaller than the first distance threshold, or larger than the first distance threshold and smaller than the second distance threshold, determine whether a number of handovers of the mobile terminal between the original cell and the neighboring cell exceeds a number threshold for handovers of the mobile terminal between the original cell and the neighboring cell; and
when determining that the number of handovers of the mobile terminal between the original cell and the neighboring cell exceeds the number threshold for handovers of the mobile terminal between the original cell and the neighboring cell, determine that the original cell suffers from cross-cell coverage.

14. The apparatus according to claim 13, further comprising an input unit, configured to input the cross-cell evaluation threshold to the comparison and determination unit;
wherein the cross-cell coverage evaluation threshold comprises: the loop location threshold for the farthest neighboring cell, the loop number threshold for the configured neighboring cells within the mainlobe of the original cell in the loop on which the farthest neighboring cell is located, the distance thresholds, and the number threshold for handovers of the mobile terminal between the original cell and the neighboring cell when the distances of the mobile terminal to the original cell and to the neighboring cell are larger than the distance thresholds.

15. The apparatus according to claim 8, further comprising an input unit, configured to input the cross-cell evaluation threshold to the comparison and determination unit;
wherein the cross-cell coverage evaluation threshold comprises: the loop location threshold for the farthest neighboring cell, the loop number threshold for the configured neighboring cells within the mainlobe of the original cell in the loop on which the farthest neighboring cell is located, the distance thresholds, and the number threshold for handovers of the mobile terminal between the original cell and the neighboring cell when the distances of the mobile terminal to the original cell and to the neighboring cell are larger than the distance thresholds.

* * * * *